United States Patent [19]

Shveima

[11] Patent Number: 5,502,265
[45] Date of Patent: Mar. 26, 1996

[54] CHROMIUM RIBBON-LIKE SILICATE CLAY α-OLEFIN CATALYSTS

[75] Inventor: Joseph S. Shveima, Bartlesville, Okla.

[73] Assignee: Phillips Petroleum Company, Bartlesville, Okla.

[21] Appl. No.: 314,998

[22] Filed: Sep. 29, 1994

Related U.S. Application Data

[60] Division of Ser. No. 59,228, May 6, 1993, Pat. No. 5,376,611, which is a continuation-in-part of Ser. No. 803,857, Dec. 9, 1991, abandoned.

[51] Int. Cl.$^6$ .................................................. C07C 2/08
[52] U.S. Cl. ............................................ 585/530; 585/533
[58] Field of Search ................................. 585/530, 533

[56] References Cited

U.S. PATENT DOCUMENTS

| | | | |
|---|---|---|---|
| 3,008,943 | 11/1961 | Guyer | 260/93.7 |
| 3,844,979 | 10/1974 | Hickson | 252/455 R |
| 3,887,454 | 6/1975 | Hickson | 208/111 |
| 4,060,480 | 11/1977 | Reed et al. | 208/111 |
| 4,176,090 | 11/1979 | Vaughan et al. | 252/455.2 |
| 4,216,188 | 8/1980 | Shabria et al. | 423/118 |
| 4,248,739 | 2/1981 | Vaughan et al. | 252/455 R |
| 4,452,910 | 6/1984 | Hopkins et al. | 502/84 |
| 4,665,045 | 5/1987 | Pinnavaia et al. | 502/84 |
| 4,742,033 | 5/1988 | Harris et al. | 502/68 |
| 5,376,311 | 12/1994 | Shveima | 502/84 |

*Primary Examiner*—Asok Pal
*Assistant Examiner*—Bekir L. Yildirim
*Attorney, Agent, or Firm*—Cynthia L. Stokes

[57] ABSTRACT

A process for polymerizing olefins with a catalyst system which comprises contacting a ribbon-like clay selected from the group consisting of sepiolites with a chromium solution. Preparation of said chromium solution comprises the steps of:

a) dissolving a chromium salt and a base in water by heating solution at a temperature in the range of about 20° C. to about 100° C. thereby producing a first chromium solution having a pH in the range of about 1.5 to 2.5;

b) diluting said first chromium solution with water so as to produce a second chromium solution wherein first chromium solution is diluted such that the ratio of added water to first chromium solution is in the range of about 5 ml $H_2O$ to about 10 mls $H_2O$ to per ml first solution, and thereafter heating said second chromium solution at a temperature in the range of about 60° C. to about 95° C. for a time period in the range of about 60 to about 180 minutes.

Pillared clays are then heat activated to produce chromium clay catalyst systems capable of polymerizing olefins.

10 Claims, No Drawings

CHROMIUM RIBBON-LIKE SILICATE CLAY α-OLEFIN CATALYSTS

This application is a divisional of application Ser. No. 08/059,228, filed May 6, 1993, now U.S. Pat. No. 5,376,611, which is a continuation-in-part of application Ser. No. 07/803,857, filed Dec. 9, 1991, now abandoned.

This invention relates to a process for forming clay catalysts that can be used in a catalyst system for the polymerization of α-olefins. In one aspect, the present invention relates to novel polymerization catalysts. In another aspect, the present invention relates to a process for polymerizing α-olefins. In yet another aspect, this invention relates to novel polymers of α-olefins.

BACKGROUND OF THE INVENTION

The preparation of pillared interlayer clay compositions by reacting a smectite-type clay with an aqueous solution of suitable polymeric catonic hydroxy metal complexes of metals, such as aluminum, titanium, zirconium and chromium is known, as illustrated in U.S. Pat. Nos. 4,665,045, 4,742,033, herein incorporated by reference. Further, U.S. Pat. No. 4,665,045, Pinnavaia et al. discloses that such pillared interlayed clay compositions that are prepared with chromium can be used in olefin polymerization.

However, there is an ever present need to develop pillared interlayered clays with new processes that result in different catalysts. Equally important is the need to develop a process to produce efficient clay catalysts on a commercial scale. Further, a better understanding of the considerable diversity within this group of clays is needed such that the type of polymers produced can be explored for special or unique properties.

SUMMARY OF THE INVENTION

It is therefore an object of this invention to provide a novel method for preparing catalyst compositions.

It is another object of this invention to provide a novel catalyst composition well-adapted for the polymerization of α-olefins.

It is still a further object of this invention to provide an improved process for the polymerization of α-olefins.

These and other objects of the present invention will become apparent from the disclosure and claims herein provided.

In accordance with the present invention, there is provided a novel process for preparing pillared chromium ribbon-like silicate clay α-olefins catalysts is disclosed which comprises contacting a ribbon-like clay selected from the group consisting of sepiolites and palygorskites with a chromium solution. Preparation of said chromium solution comprises the steps of:

a) dissolving a chromium salt and a base in water by heating solution at a temperature in the range of about 20° C. to about 100° thereby producing a first chromium solution having a pH in the range of about 1.5 to 2.5;

b) diluting said first chromium solution with water so as to produce a second chromium solution wherein first chromium solution is diluted such that the ratio of added water to first chromium solution is in the range of about 5 ml $H_2O$ to about 10 mls $H_2O$ per ml of first solution, and thereafter heating said second chromium solution at a temperature in the range of about 60° C. to about 95° C. for a time period in the range of about 60 to about 180 minutes; thereafter said pillard clays are activated to produce a chromium clay catalyst system.

In a further embodiment there is provided the activation of said clay comprising the following steps of:

(a) heating said first product at a temperature in the range of about 150° C. to about 500° C. and for a time period in the range of about 30 minutes to about 10 hours in an inert atmosphere;

(b) thereafter continuing heating said first product at a temperature in the range of about 500° C. to about 900° C. and for a time period in the range of about 1 hour to about 50 hours in an oxidizing atmosphere and recovering said catalyst composition.

In further accordance with the present invention, there is provided an improved method for the polymerization of α-olefins which result in novel polymer compositions and which comprises: contacting at least one mono-1-olefin having 2 to 8 carbon atoms per molecule with said catalyst; optionally copolymerizing a comonomer having from about 3 to about 8 carbon atoms per molecule; and optionally combining said catalyst with an organo-metal cocatalyst.

DETAILED DESCRIPTION

General Preparation of Chromium—Pillared Clays

The clays employed in the present are the palygorskites and sepiolites which are morphologically different from clays which have been pillared in the past. Both palygorskites and sepiolites are chain clays which contain three layer units having an octahedral layer sandwiched between two tetrahedral arrays of silicas. However, the octadedral sheets are discontinuous whereas the silica tetrahedral layers, while remaining continuous, contain alternating segments of inverted tetrahedra. The octadedral discontinuity occurs at each inversion point. Additionally, the natural abundance and commercial availability of clays make then an inexpensive alternative to more costly synthetic silicas presently used for olefin polymerization.

The method employed consists of considerable modifications to the process disclosed in Pinnavaia et al of U.S. Pat. No. 4,665,045. One differentiating factor is that Pinnavaia is limited to ". . . an aqueous slurry of a layer lattice clay selected from the group consisting of smectites, vermicultie, and flurohectorite . . . ". The present invention utilizes palygorskites and sepiolates, clays which are not known in references to be pillarable due to their unique structure. This unusual arrangement is reflected in their ribbonlike morphologies. They are fibrous minerals. Unlike the smectites, the palygorskites and sepiolites contain molecular or zeolitic water within the channels created by the discontinuities in addition to surface-sorbed water.

In combination with utilizing clays not previously known to be pillarable, the present invention provides a novel process for preparing a pillared clay first product which comprises containing a ribbon-like clay selected from the group consisting of sepiolites having a surface area in the range of about 125 to about 215$M^2$/g and a pore volume in the range of about 0.35 to about 0.70 $cm^3$/g and palygorskites having a surface area in the range of about 110 to about 140$M^2$/g and a pore volume in the range of about 0.50 to about 0.70 $cm^3$/g, with a chromium solution having a chromium content in the range of about 0.001 g/ml to about 0.01 g/ml and a pH in the range of about 1.5 to about 2.5.

The chromium solution of the present invention which will contact the clay, is prepared by dissolving a chromium salt and a base in water by heating solution at a temperature in the range of about 20° C. to about 100° C. thereby producing a first chromium solution having a pH in the range of about 1.5 to 2.5; and diluting said first chromium solution with water so as to produce a second chromium solution wherein first chromium solution is diluted such that the ratio of added water to first chromium solution is in the range of about 5 ml $H_2O$ to about 10 mls $H_2O$ to per ml first solution, and thereafter heating said second chromium solution at a temperature in the range of about 60° C. to about 95° C. for a time period in the range of about 60 to about 180 minutes the first step of which is preparing a hydrolyzed first solution by dissolving a chromium salt and a base in water, heating said first solution to a temperature in the range of about 20° C. to about 100° while stirring continuously until the solution reaches a pH in the range of about 1.5 to about 2.5 and thereby producing a master batch.

A preferred sepiolite has a surface area of about $137M^2/g$ and a pore volume of about 0.5 $cm^3/g$. A preferred palygorskite has a surface area of about $126M^2/g$ and a pore volume of about 64 $cm^3/g$.

The heating facilitates, in a reasonable time, the hydrolytic oligomerization of chromium while the pH indicates when to stop heating so as to optimize the concentration of the polyhydroxy chromium oligomers. Using the pH of said first solution to determine when heating is sufficient is a novel method of accomplishing what is referred to in prior patents as "aging". Preferably, the heating is conducted at a temperature of about 90° C. while stirring continues until said first solution reaches a pH of about 2.3.

According to the present invention, the base is selected from the group consisting of sodium carbonate, ammonium carbonate, sodium hydroxide and ammonium hydroxide with preference given to sodium carbonate. Said salt is selected from the group consisting of chromium nitrate, chromium chloride and chromium acetate with preference given to chromium nitrate.

The dilution step provides a means whereby the Cr content of the final catalyst can be controlled. When known methods of preparing pillared silicate clays are used, the final clay product is high in Cr content; and when this product is utilized as a polymerization catalyst, an unacceptably high amount of Cr(VI) is present. Possible health hazards associated with Cr(VI) are diminished when the initial Cr content is controlled via the method of the present invention.

The above dilution is carried out such that said first solution is diluted to the ratio of about 0.5 ml $H_2O$ to about 10 ml $H_2O$ to about 1 ml first chromium solution with a preferred dilution ratio of about 4 mls $H_2O$ to about 1 ml first chromium solution, to produce a second chromium solution which is heated to a temperature in the range of about 60° C. to about 950° for a time period in the range of about 60 to 180 minutes; and with a preferred heating at about 90° C. for a preferred time of about 120 minutes.

In accordance with the present invention, a solid clay selected from the group consisting of sepiolites and palygorskites is added to either the first chromium solution or to the heated second chromium solution. The liquid volume of the solution is in the range of about 0.5 ml to about 20 mls per gram of clay and contains an amount of chromium in the range of about 0.001 grams to about 0.01 grams per ml of second chromium solution. A preferred volume of second chromium solution being about 9 mls per gram of clay and containing about 0.0022 grams of chromium per ml of said second solution.

The novel pillared chain silicate clay may be recovered by conventional methods well known to those skilled in the art. However, it is preferred that said pillared chain silicate clay be washed and centrifuged with an initial series of washes being conducted with $H_2O$ and a secondary series of washes being conducted with an alcohol for the purpose of removing excessive amounts of $H_2O$ before the final drying step. This produces a first product which is thereafter dryed using any method known to those of skill in the art such as oven or vacuum drying. Other methods to remove water include but are not limited to azeotrope drying, spray drying or freeze drying.

When the pillared clay first product is a sepiolite, it has a chromium weight percent in the range of about 0.5 to about 20, a surface area in the range of about 220 to about $510M^2/g$, and a pore volume in the range of about 0.50 to about 1.5 cms/g. A preferred sepiolite first product has a chromium weight percent of about 1, a surface area of about $226M^2/g$, and a pore volume of about 0.7 $cm^3$.

When the pillared clay first produces a process wherein said pillared clay first product is a palagorskite and has a chromium weight percent in the range of about 0.5 to about 20, a surface area in the range of about 100 to about $300M^2g$, and a pore volume in the range of about 0.5 to about 1.5 $cm^3/g$.

A process wherein said pillared clay first product is a palagorskite and has a chromium weight percent of about 4.7, a surface area of about $169M^2/g$, and a pore volume of about 0.59 $cm^3/g$.

General Activation of Chromium-Pillared Clays

The dryed chromium pillared clays can be activated to achieve a catalyst system by heating said first product at a temperature in the range of about 150° C. to about 500° C. and for a time period in the range of about 30 minutes to about 10 hours in an inert atmosphere, with a preferred temperature of about 500° C. for a time period of about 1 hour; and thereafter continuing heating said first product at a temperature in the range of about 500° C. to about 900° C. and for a time period in the range of about 1 hour to about 50 hours in an oxidizing atmosphere and recovering a second product, with a preferred temperature of about 650° C. for a time period of about 3 hours.

Optionally, the activation may further comprise cooling said second product to a temperature in the range of about 300° C. to about 500° C. and for a time period in the range of about 1 minute to about 5 hours in a reducing atmosphere, with a preferred temperature of 350° C. for a time period of about 30 minutes. The optional heating accomplishes a more productive olefin polymerization catalyst than that which is made via a one-step continuous heating is unable to achieve.

When the second product, i.e. the activated chromium catalyst, is a sepiloite clay, it has a process wherein said second product is an activated sepiolite clay having a chromium weight percent in the range of about 0.5 to 20, a surface area in the range of about 120 to about $320M^2g$; and a pore volume in the range of about 0.4 to about 1.5 $cm^2/g$.

With a preferred a process in which said second product is an activated sepiolite clay having chromium weight percent 1.1, a surface area of $165M^2/g$ and a pore volume of 0.75 $cm^2/g$.

When the second product, i.e. the activated chromium catalyst is a palygorskite, it has a process wherein said second product is an activated palygorskite clay having a chromium weight percent in the range of about 0.5 to about 20; a surface area in the range of about 90 to about 300M$^2$/g; and a pore volume in the range of about 0.3 to about 1.5 cm$^3$/g.

With a preferred process in which said second product is an activated palagorskite clay having a chromium weight percent of 4.7; a surface area of 108M$^2$/g and a pore volume of 0.43 cm$^3$/g.

General Polymerization Process Utilizing Novel Catalyst System

The polymerization process of the present invention requires that at least one olefin having 2 to 8 carbon atoms per molecule be contacted with said novel catalyst system. The olefin is selected from the group consisting of ethylene, propylene, 1-pentene, 1-hexene, and 1-octene. Preferably said olefin is predominantly ethylene.

A comonomer may be copolymerized with ethylene to form an ethylene copolymer. Said comonomer is selected from the group consisting of propylene, 1-butene, 1-pentene, 1-hexene, and 1-octene. Preferred copolymers are those of ethylene and 0.4 to 1 weight percent of a comonomer selected from C$_4$ to C$_{12}$ mono-1-olefins, most preferably hexene.

Additionally, said novel catalyst system may be combined with an organo-metal cocatalyst selected from the group consisting of: triethylaluminum, triethylboron, and diethylsilane. Preferred cocatalyst is triethylaluminum.

EXAMPLES

The following examples have been provided merely to illustrate the practice of the invention and should not be read as to limit the scope of the invention or the appended claims in any way.

Tables 1–6 define the characteristics and chemical composition of the sepiloite and palagorskite clays as they exist in nature, in pillared form, and after activation.

TABLE 1

Sepiolite Clays Defined

| Clay Type | Origin | Surface Area (M$^2$/g) | Pore Volume (cm$^3$/g) | SiO$_2$ % | Al$_2$O$_3$ % | MgO % | CaO % | Fe2O$_3$ % | K$_2$O+ Na$_2$O % | H$_2$O % |
|---|---|---|---|---|---|---|---|---|---|---|
| Asi | Asia | 212 | 0.66 | 52.3 | 0.04 | 23.6 | 3.6 | 0.1 | 0.3 | 17.3 |
| Ken | Kenya | 207 | 0.57 | 66.8 | 0.04 | 22.1 | 0.4 | 0.3 | 0.9 | 13.1 |
| Sp$_1$ | Spain | 137 | 0.52 | 59.9 | 2.4 | 22.0 | 0.2 | 0.6 | 1.3 | 11.2 |
| Sp$_2$ | Spain | 142 | 0.54 | 61.6 | 2.5 | 22.2 | 0.2 | 0.8 | 1.4 | 13.2 |
| Suf | Nevada | 129 | 0.39 | 56.4 | 5.8 | 15.4 | 5.9 | 1.4 | 2.3 | 6.9 |

TABLE 2

Pillared Chromium Sepiolites

| Pillared Sepiolite Clay | Clay Type | Cr Wt. % | Surface Area M$^2$/g | Pore Volume cm$^3$/g |
|---|---|---|---|---|
| P1 | Asi | 12.0 | 502 | 0.66 |
| P2 | Ken | 11.0 | ND | ND |
| P3 | Sp$_1$ | 1.3 | 268 | 0.56 |
| P4 | SP$_1$ | 1.5 | 252 | 0.66 |
| P5 | Sp$_1$ | 1.0 | 226 | 0.71 |
| P6 | Sp$_1$ | 4.4 | 367 | 0.75 |
| P7 | Sp$_1$ | 2.3 | 313 | 0.62 |
| P8 | Sp$_1$ | ND | ND | ND |
| P9 | SP$_2$ | ND | ND | ND |
| P10 | Suf | ND | ND | ND |

*ND = Not determined

TABLE 3

Activated Sepiolites

| Catalyst No. | Catalyst Made From Pillared Clay | Activation Conditions | Cr Wt. % | Surface Area M$^2$/g | Pore Volume cm$^3$/g |
|---|---|---|---|---|---|
| A1 | P1 | 500/N$_2$,600/Air | 13.0 | 320 | 0.65 |
| A2 | P2 | 500/N$_2$,600/Air, 350/CO | 13.0 | 262 | 0.52 |
| A3 | P3 | 500/N$_2$,600/Air | 1.4 | 121 | 1.10 |
| A4 | P4 | 500/N$_2$,700/Air | 1.6 | 147 | 0.64 |
| A5 | P5 | 500/N$_2$,600/Air | 1.1 | 165 | 0.75 |
| A6 | P6 | 500/N$_2$,600/Air | 4.7 | 199 | 0.52 |
| A7 | P8 | 500/N$_2$,500/Air | 1.4 | 197 | 0.89 |
| A8 | P9 | 500/N$_2$,600/Air, 350/CO | 2.2 | 198 | 0.52 |
| A9 | P10 | 500/N$_2$,600/Air, 350/CO | 4.5 | 127 | 0.41 |

TABLE 4

Palygorskite Clays Defined

| Clay Type | Origin | Surface Area ($M^2/g$) | Pore Volume ($cm^3/g$) | $SiO_2$ % | $Al_2O_3$ % | MgO % | CaO % | $Fe2O_3$ % | $K_2O+$ $Na_2O$ % | $H_2O$ % |
|---|---|---|---|---|---|---|---|---|---|---|
| ATT | Georgia | 126 | 0.64 | 62.0 | 10.3 | 9.8 | 1.9 | 3.5 | 1.1 | 10 |

TABLE 5

Pillared Chromium Palygorskites

| Pillard Palygorskite Clay | Clay Type | Cr Wt. % | Surface Area $M^2/g$ | Pore Volume $cm^3/g$ |
|---|---|---|---|---|
| P11 | ATT | 4.7 | 169 | 0.59 |
| P12 | ATT | ND | ND | ND |

TABLE 6

Activated Palygorskites

| Catalyst | From Pillard Clay | Activation Conditions | Cr Wt. % | Surface Area $M^2/g$ | Pore Volume $cm^3/g$ |
|---|---|---|---|---|---|
| A11 | P11 | 500/$N_2$,600/Air | 5.9 | 108 | 0.43 |
| A12 | P12 | 500/$N_2$,600/Air | ND | ND | ND |

The activation conditions refer to degrees Celsius in either nitrogen, air, or carbon monoxide. The heating in a nitrogen atmosphere was continued for 1 hour; the heating in air was continued for 3 hours; and the heating in a carbon monoxide atmosphere was continued for 30 minutes.

Ppreparation of Ribbon-Like Silicate Pillared Clay

EXAMPLE I

A series of chromium-containing sepiolite clay catalysts were prepared from clay Type $Sp_1$.

Preparation of first chromium solution: 1333 grams (3.33 moles) of $Cr(NO_3)_3·9H_2O$ was dissolved in 13.3 liters of deionized water to which was added slowly while stirring a solution made by dissolving 353 grams (3.33 moles) of $Na_2CO_3$ in 6.7 liters of deionized water. While stirring continuously, the mixture was heated at 90°–95° C. for 15 to 24 hours replenishing any water loss because of evaporation. The mixture was cooled and stored at ambient temperature.

To 1 liter of first chromium solutions, 2.0 liters of deionized water were added and then heated to 90°–95° C. While it was stirred continually over a 15 minute period, 454 grams of Clay Type $Sp_1$ were added. After addition of the clay, the solution was stirred and heated for 3 hours replenishing any water loss because of evaporation. The clay liquid mixture was divided among 4 to 8 1-liter centrifuge bottles. Each batch was centrifuged and washed six times with 600 mL portions of deionized water followed by 4 times with 600 mL portions of methanol. The individual batches were recombined and dried in a vacuum oven at 50°–100° C. with a nitrogen purge overnight. The dry pillared clay was then ground using a Wiley Mill and sieved through a 50-mesh screen to achieve P5.

Activation

EXAMPLE II

Twenty to twenty-five grams of P5 was activated for polymerization in a laboratory sized fluidized bed (quartz tube (60 cm×5 cm) at elevated temperatures by sequential treatment with a stream of dry nitrogen for one hour at 500° C. followed by a stream of dry air for three hours at 600° C. After activation, catalyst A5 was cooled under a stream of dry nitrogen to ambient temperature, recovered and stored in dry nitrogen until ready for use.

EXAMPLE III

Catalyst A8 was prepared in a similar manner to that of A5 with the exception being, after air oxidation, the catalyst was cooled under nitrogen to 350° C. at which temperature a stream of dry CO was passed through the catalyst bed for 30 to 45 minutes. The CO was then purged with dry nitrogen while cooling to ambient temperature. The catalyst was recovered and stored as above.

Polymerization

EXAMPLE IV

The polymerization of ethylene alone or in admixture with hexene-1 comonomer was carried out in a particle form process employing a 2.6 liter stainless-steel jacketed reactor. After flushing the clean reactor with dry nitrogen and dry isobutane vapor, one liter of dry, liquid isobutane was added as diluent. The sealed reactor was heated to the specified temperature after which a weighted amount of catalyst (0.03 to 1 gram) was charged and a solution of cocatalyst, if used, amounting to about 1.0–2.0 mL of a 0.5 weight percent organometal compound such as triethylaluminum triethylboron and diethylsilane and mixtures thereof. The reactor was then pressurized to 550 psig with ethylene and maintained at that pressure throughout the reaction with ethylene flow being regulated by the rate of polymerization. Polymerization time was normally one hour. The productivity was calculated by dividing the weight of the dried reactor product by the weight of catalyst for a one-hour run and was expressed in terms of grams polymer per gram catalyst per hour. Polymerization times deviating from 60 minutes were normalized to 60 minutes on the basis of the observed constant polymerization rate exhibited by these clay based olefin catalysts under a variety of polymerization conditions. Thus, the uncorrected productivity value was corrected to 60 minutes by multiplying it with 60 and dividing that result by the actual polymerization time in minutes.

The catalyst, polymerization conditions, results and selected properties of the polyethylenes obtained are presented in Table 7.

TABLE 7

Polymerization Results and Polyethylene Properties

| Catalyst No. | Temp. °C. | Hexene-1 (wt %) | Adjuvant (ppm) | Productivity g/g/hr | HLMI | Density g/cc |
|---|---|---|---|---|---|---|
| A5 | 88 | | TEA(5) | 2020 | | |
| A5 | 88 | | TEA(5) | 1560 | | |
| A5 | 95 | | | 3170 | | |
| A5 | 105 | | | 2580 | 0.3 | |
| A5 | 105 | 1.1 | | 2070 | 0.7 | 0.944 |
| A5 | 105 | | TEA(5) | 2480* | 2.8 | 0.951 |
| A5 | 105 | | | 2050 | 1.4 | |
| A5 | 105 | 1.1 | | 1100 | 0.7 | 0.946 |
| A5 | 105 | | TEA(5) | 3560* | 2.9 | 0.953 |
| A8 | 105 | | | 1920 | 0.2 | |
| A8 | 105 | | TEA(3) | 2300* | 6.1 | 0.948 |
| A8 | 95 | | | 1600 | | |
| A8 | 95 | 1.1 | TEA(5) | 1500* | 8.0 | |

*Reactor contains 5 mole percent hydrogen.

EXAMPLE V

Preparation of Pillared Palygorskite Clay

One Hundred and sixty ml of first chromium solution was heated to 90°–95° C. While it was continually stirred, 6.5 grams of Clay Type ATT were added and heated for 1 hour. After cooling to ambient temperature the mixture was transferred to a 1-liter centrifuge bottle. The mixture was centrifuged and washed six times with 600 ml portions of deionized water followed by four times with 600 ml portions of methanol. The pillared clay was dried in a vacuum oven set at 100°–100° C. with a nitrogen purge for 24 hours. A sample was ground in a laboratory mill and passed through a No. 50 sieve to render pillared Clay, P11.

EXAMPLE VI

To 18 ml of the first chromium solution, 52 ml of deionized water were added. This second chromium solution was heated to 90°–95° C. While continually stirring 7.0 grams of palygorskite clay were added. After addition of clay, the mixture was heated while stirring for 1 hour. The chromium pillared palygorskite clay was isolated, washed dried and ground as described in Example V to render pillared clay, P12.

EXAMPLE VII

Pillared clays P 11 and P 12 were activated as described in Example II to render catalysts A 11 and A 12.

EXAMPLE VIII

The polymerization of ethylene using Catalyst A11 and one using A12 was carried out as per Example IV. The catalyst, polymerization conditions, results and selected properties of the polyethylenes obtained are presented in Table 8.

TABLE 8

Polymerization Results and Polyethylene Properties

| Catalyst No. | Temp. °C. | Adjuvant (ppm) | Productivity g/g/hr |
|---|---|---|---|
| A11 | 95 | TEA(5) | 3600 |
| A12 | 95 | TEA(5) | 2450 |

That which is claimed:

1. A process for polymerizing at least one olefin having 2 to 8 carbon atoms per molecule which comprises contacting said olefin under polymerization conditions with a catalyst system which was produced by the process comprising:

(a) contacting a ribbon-like clay selected from the group consisting of sepiolites having a surface area in the range of about 125 to about 215$M^2$/g and a pore volume in the range of about 0.35 to about 0.70 $cm^3$/g and palygorskites having a surface area in the range of about 110 to about 140$M^2$/g and a pore volume in the range of about 0.50 to about 0.70 $cm^3$/g, with a chromium solution having a chromium content in the range of about 0.001 g/ml to about 0.01 g/ml and a pH in the range of about 1.5 to about 2.5 thereby preparing a first product;

(b) heating said first product at a temperature in the range of about 150° C. to about 550° C. and for a time period in the range of about 30 minutes to about 10 hours in an inert atmosphere;

(c) thereafter continuing heating said first product at a temperature in the range of about 500° C. to about 900° C. and for a time period in the range of about 1 hour to about 50 hours in an oxidizing atmosphere.

2. A product produced by the process of claim 1.

3. A process according to claim 1 wherein said olefin is selected from the group consisting of ethylene, propylene, 1-pentene, 1-hexene, and 1-octene.

4. A process according to claim 1 wherein said olefin is predominantly ethylene.

5. A process according to claim 4 wherein a comonomer having from about 3 to about 8 carbon atoms per molecule is copolymerized with ethylene to form an ethylene copolymer.

6. A process according to claim 4 wherein said comonomer is selected from the group consisting of propylene, 1-butene, 1-pentene, 1-hexene, and 1-octene.

7. A process according to claim 6 wherein said comonomer is 1-hexene.

8. A process according to claim 1 further comprising combining said catalyst system with an organo-metal cocatalyst.

9. A process according to claim 8 further comprising a cocatalyst selected from the group consisting of: triethylaluminum, triethylboron, and diethylsilane.

10. A process according to claim 8 wherein said cocatalyst is triethylaluminum.

* * * * *